(12) United States Patent
Rice et al.

(10) Patent No.: US 7,991,021 B2
(45) Date of Patent: Aug. 2, 2011

(54) MULTIMODE RAMAN FIBER DEVICE WITH MODE DISCRIMINATION

(75) Inventors: Robert R. Rice, Simi Valley, CA (US); Sami Ali Shakir, Albuquerque, NM (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1390 days.

(21) Appl. No.: 10/729,261

(22) Filed: Dec. 5, 2003

(65) Prior Publication Data

US 2005/0123007 A1 Jun. 9, 2005

(51) Int. Cl.
*H01S 3/30* (2006.01)
(52) U.S. Cl. .................. 372/3; 372/6; 385/124
(58) Field of Classification Search ............ 372/3, 6
See application file for complete search history.

(56) References Cited

U.S. PATENT DOCUMENTS

| | | | |
|---|---|---|---|
| 4,111,525 A * | 9/1978 | Kaminow et al. | 385/124 |
| 4,822,399 A * | 4/1989 | Kanamori et al. | 65/398 |
| 5,323,404 A * | 6/1994 | Grubb | 372/6 |
| 6,363,087 B1 | 3/2002 | Rice | |
| 6,751,388 B2 * | 6/2004 | Siegman | 385/124 |
| 2002/0135866 A1 * | 9/2002 | Sasaoka et al. | 359/334 |
| 2003/0161361 A1 * | 8/2003 | Paldus et al. | 372/20 |
| 2003/0215200 A1 * | 11/2003 | Yokokawa et al. | 385/123 |
| 2004/0071418 A1 * | 4/2004 | Seo et al. | 385/123 |

FOREIGN PATENT DOCUMENTS

| | | |
|---|---|---|
| EP | 1 289 078 A | 3/2003 |
| WO | WO 0250964 A2 * | 6/2002 |
| WO | WO 03/055017 A | 7/2003 |

OTHER PUBLICATIONS

Seo H-S et al: "Optimization of Silica Fiber Raman Amplifier Using the Raman Frequency Modeling for Arbitrary Ge02 Concentration in the Core"; Optics Communications, North-Holland Publishing Co., Amsterdam, NL, vol. 181, No. 1-3, Jul. 2000, pp. 145-151, XP004206629, ISSN: 0030-4018.

Butylkin V S et al: "Excitation of Stimulated Raman Scattering in Graded-Index Fiber Waveguides by an Arbitrary Gaussian Beam"; Soviet Journal of Quantum Electronics USA, vol. 12, No. 11, Nov. 1982, pp. 1505-1507, XP008057258, ISSN: 0049-1748.

\* cited by examiner

*Primary Examiner* — Tod T Van Roy
(74) *Attorney, Agent, or Firm* — Tarolli, Sundheim, Covell & Tummino LLP

(57) ABSTRACT

A multimode optical fiber has a core that includes radially dependent dopant materials to provide a desired refractive index profile and a desired Raman gain coefficient profile. A laser diode pump laser array provides high brightness light that is launched into the fiber and is subject to maximum Raman gain along the optical axis, thereby favoring the lowest order mode of the fiber, discriminating against higher order modes and providing a high brightness, diffraction limited output. The fiber can be incorporated into oscillators, amplifiers and other optical devices.

13 Claims, 2 Drawing Sheets

MULTIMODE RAMAN FIBER DEVICE WITH MODE DISCRIMINATION

BACKGROUND OF THE INVENTION

This invention relates generally to laser fiber amplifiers and, more particularly, fiber amplifiers employing stimulated Raman scattering (SRS) for optical mode discrimination. The principle of SRS is widely known and used in connection with laser amplifiers. U.S. Pat. No. 6,363,087 B1 issued in the name of Robert R. Rice and entitled "Multimode Raman Fiber Amplifier and Method," discusses the prior art of Raman fiber amplifiers. This patent, which will be referred to for convenience as "the '087 Rice patent," discloses a device and method that have objectives similar to those of the present invention.

For a variety of both military and commercial applications, there is a need for laser amplifiers that can efficiently convert electrical power to high brightness laser output. A commonly proposed solution is to use electrical power to energize a high brightness laser diode pump array, the output of which is used to excite an appropriate rare earth dopant ion, such as neodymium (Nd) or ytterbium (Yb), in a crystal or fiber host to provide optical gain for a desired wavelength. The excited rare earth dopant establishes the wavelength for laser operation and converts some of the pump photon energy into heat, which reduces efficiency and produces deleterious temperature gradients in the host medium. In the device of the '087 Rice patent, the diode pump radiation produces optical gain by a nonlinear process, stimulated Raman scattering, which occurs at a wavelength shifted down in energy by a small amount (approximately 300-500 $cm^{-1}$) from the photon energy of the pump. This small energy loss is significantly smaller that the energy lost in the conventional pumping process, leading to higher potential efficiency, less heat deposited in the host medium, and flexibility in operating wavelength, which is determined solely by the pumping source.

Raman oscillators are available as commercial products, but all are single-mode devices, which require pumping by single-mode pump sources. The '087 Rice patent disclosed a fiber of dual-clad design, including a uniform single-mode core, a surrounding Raman pump core and a low index outer cladding. The pump signal, which is presumed to be multimode, is launched or focused into the Raman pump core of the fiber amplifier and, at least in theory, a single-mode output is obtained. In practice, mode discrimination in the device is highly dependent on the ability to launch the pump signal "cleanly" in a lowest order mode. Some mode discrimination is also provided by attenuation of higher order modes due to scatter that occurs at the interfaces between the central core and the Raman core and between the Raman core and the outer cladding layer.

Accordingly, there is still a need for improvement in the field of Raman fiber amplifiers. Specifically, there is a need for a Raman fiber amplifier that reliably produces a single-mode output from the multimode pump laser input. The present invention is directed to this end.

SUMMARY OF THE INVENTION

The present invention resides in a multimode optical fiber that favors lower order modes. Briefly, and in general terms, the fiber comprises a core having a longitudinal optical axis and incorporating radially dependent amounts of dopant materials to provide a desired refractive index profile and a desired Raman gain coefficient profile that favors lower order modes and discriminates against higher order modes; and a cladding region surrounding the core and having a refractive index different from that of the core material. Light launched into an end of the fiber is subject to higher Raman gain along the optical axis, which promotes lower order modes and discriminates against higher order modes.

More specifically, the core incorporates radially dependent amounts of selected transparent oxides, to provide radially dependent control of the refractive index; and radially dependent amounts of a dopant that affects the Raman gain coefficient, to provide a radially dependent Raman gain coefficient profile. Both the refractive index and the Raman gain coefficient have their highest values along the optical axis of the fiber. The dopant that affects the Raman gain coefficient may be, for example, germanium oxide. In an illustrative embodiment of the invention, the refractive index profile and the Raman gain coefficient profile both have a generally parabolic shape with a peak coinciding with the optical axis of the fiber.

The invention may also be defined in terms of a Raman laser oscillator, comprising a multimode optical fiber that favors lower order modes; a diode laser array providing pump power to the laser oscillator; means for launching the pump power into the fiber; and reflective means defining a laser cavity encompassing the fiber. In one disclosed embodiment of the invention, the reflective means comprises a highly reflective mirror positioned at one end of the fiber and a partially transmitting mirror at the other end of the fiber. In another disclosed embodiment, the reflective means comprises a highly reflective mirror at one end of the fiber and a partially transmitting mirror spaced apart from the other end of fiber. The oscillator further comprises optical means for receiving light emitted from the other end of the fiber and transmitting a generally collimated beam to the partially transmitting mirror.

The invention may also be defined in terms of a method of generating a diffraction limited high brightness laser beam in a multimode fiber. The method comprises the steps of providing a multimode fiber having a core with radially dependent amounts of at least one dopant that provides a refractive index profile and a Raman gain index profile with maxima coinciding with the optical axis of the fiber; generating high brightness pump power in a laser diode array; launching the pump power into one end of the multimode fiber; in the fiber, favoring the lowest order mode by providing maximum Raman gain along the optical axis, and discriminating against higher order modes; providing a laser cavity that encompasses the multimode fiber; and outputting a diffraction limited high brightness beam from the laser cavity.

It will be appreciated from the foregoing summary that the present invention represents a significant advance in Raman laser amplifiers. In particular, the invention provides a high brightness diffraction limited output beam from a multimode laser, which has been specifically designed to discriminate against higher order modes and to favor the lowest order mode. Other aspects and advantages of the invention will become apparent from the following more detailed description, taken in conjunction with the accompanying drawings.

DETAILED DESCRIPTION OF THE INVENTION

Figure 1:
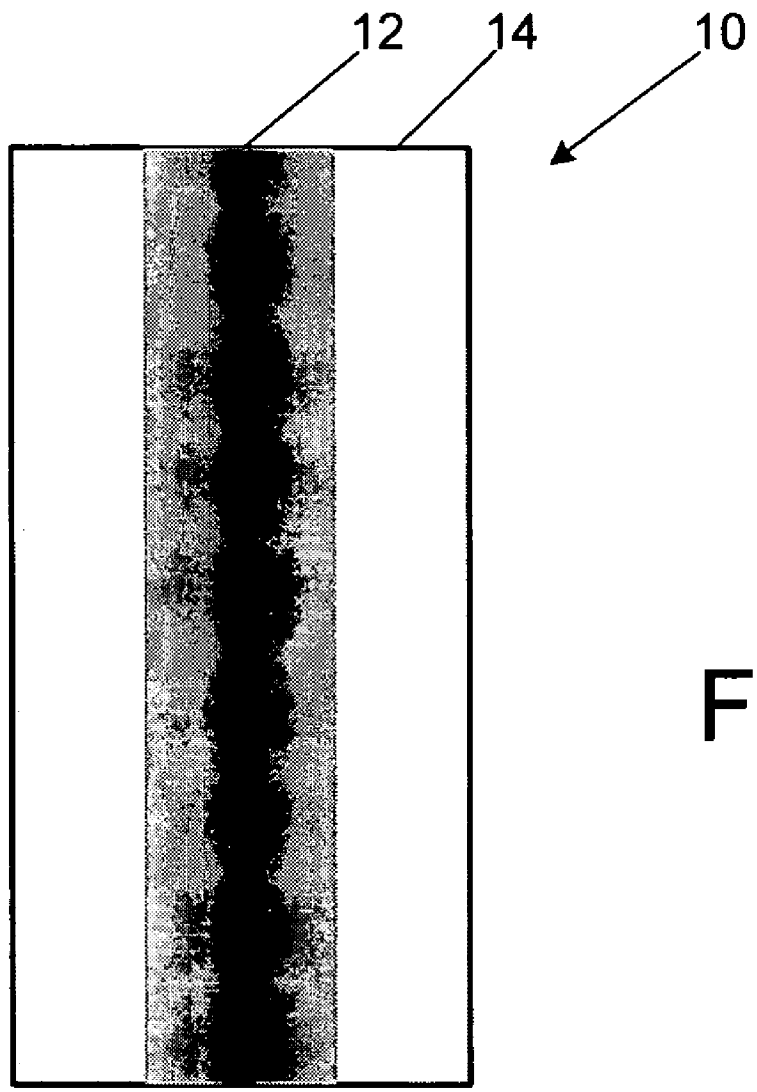
FIG. 1 is cross-sectional view of fiber in accordance with the invention, having a graded refractive index core.

As shown in the drawings for purposes of illustration, the present invention is concerned with Raman laser fiber amplifiers. Use of the Raman effect for generating single-mode laser output from multimode pump laser input power has been described in U.S. Pat. No. 6,363,087 B1 to Robert R. Rice (the '087 Rice patent), but there is still need for further improvement of the techniques disclosed in the '087 Rice patent.

In accordance with the present invention, the Raman gain profile of a fiber amplifier core is controlled to provide a higher on-axis gain, which promotes the generation of lower order modes of oscillation. More specifically, as shown in FIG. 1 the present invention is embodied in a specially designed multimode optical fiber, indicated generally by reference numeral 10, having a generally cylindrical shape, with a central core 12 surrounded by a cladding region 14. The fiber core 12 incorporates radially dependent amounts of various transparent oxides, which permits radially dependent control of the refractive index of the core material, such that a desired refractive index profile is obtained. For example, the refractive index profile may be approximately parabolic in shape, as shown at 20 in FIG. 2, with a peak value of refractive index corresponding with the optical axis of the fiber 10.

Figure 2:
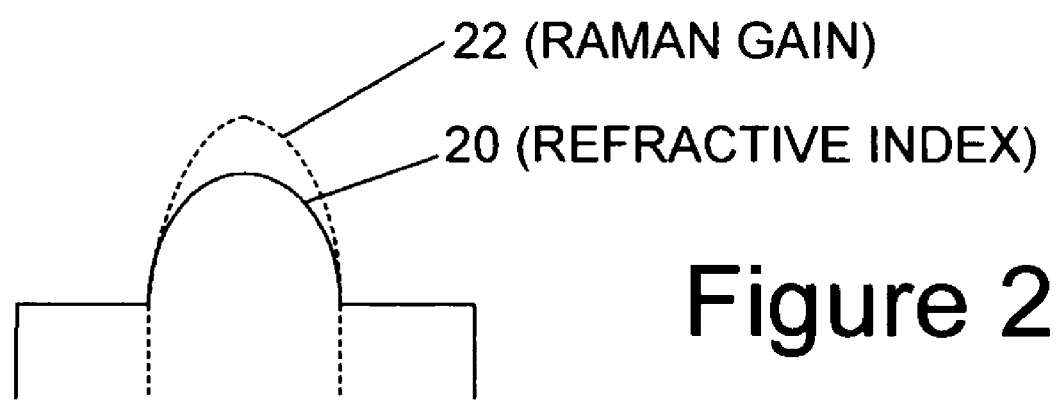
FIG. 2 is a simplified graph showing the variation of refractive index and the variation of Raman gain with respect to the cross section of the fiber of FIG. 1.

Simultaneous incorporation of materials such as germanium oxide into the fiber core 12 is used to produce a radially dependent Raman gain coefficient profile. Germanium oxide has a very large Raman gain coefficient. Incorporating a minimum amount near the interface with the cladding region 14, with a gradual transition to a maximum amount at the optical axis, will produce a radially dependent Raman gain coefficient that will strongly favor the lowest order mode of the multimode fiber at the Stokes wavelength. This modal discrimination effect at the Stokes wavelength occurs because the overlap of the highly peaked Raman gain in the multimode fiber, induced by multimode pump radiation coupled into the fiber from diode pump arrays (not shown in FIG. 1), overlaps by design the lowest and low order modes to the greatest extent. Fortuitously, the attenuation coefficients for the modes in multimode fibers increase monotonically with the mode order as well, further enhancing the discrimination effect provided by the Raman gain coefficient profile, which, as shown in FIG. 2 at 22, may also be approximately parabolic in shape. By balancing the concentrations of transparent oxides that have large Raman coefficients with those that have differential impact on the refractive index, the two profiles 20 and 22 can be independently managed within useful bounds. The precise concentrations of dopant materials added to this graded core 12 structure are dependent on specific design goals and requirements, but would be a matter of design choice for one of ordinary skill in designing optical fibers.

The simplest example of a specific design is a graded index fiber formed by the addition of germanium oxide and no codopant. The refractive index can be controlled to form a classical radial parabolic profile. By using germanium oxide in this manner, the Raman gain coefficient is also being increased radially in a way that peaks on axis and thus favors Raman amplification of the lower order Stokes modes, as noted above. The following mathematical analysis helps further explain the distinctions between the present invention and the disclosure of the '087 Rice patent. The modes are characterized by a radial value l and an azimuthial value m in the discussions that follow. The Raman gain coefficient g/m is largest for l=1 and m=0, and drops off quickly for larger values of l,m. On the other hand, the attenuation $\alpha_{lm}$ is smallest for l=1, m=0 and increases for larger values of l,m. Therefore, it can be seen that a strong mode discrimination effect can be expected.

Another interesting property of Raman gain is also important in this discussion. In a rare earth doped fiber core, gain saturation may be spatially nonuniform, thus leaving a region of high gain in which unwanted modes may experience undesired gain. In a Raman fiber amplifier, nonlinear cross coupling between pump and Stokes modes enables gain saturation across the entire input pump mode spectrum so that no inverted population is left behind to provide gain for unwanted modes. Considering threshold in a fiber Raman laser, for a fiber of length L, the difference in net gain is given by:

$$G_{lm} = \exp\{(g_{lm} - \alpha_{lm})L\}$$

Hence, the net modal gain depends exponentially on the difference between modal gain and modal attenuation coefficient. At threshold, the Raman gain clamps through gain saturation and only the lowest order mode will oscillate. The calculation of $g_{lm}$ involves knowledge of the modes for the fiber $\psi_{lm}(r)$ and the spatial variation of the Raman gain coefficient $g_R(r)$. The gain for the Stokes modes naturally depends on the distribution of power in the pump modes as well.

In the '087 Rice patent, the differential equations for propagation of pump and Stokes modes were derived for a multimode Raman amplifier. With slightly different nomenclature, we have:

$$\frac{d}{dz}P_{lm} = -P_{lm}\sum_{l',m'} S_{l'm'}K_{lm,l'm'} - \sum_{l'',m''}\kappa_{lm,l''m''}(P_{lm} - P_{l''m''}) - \alpha_{lm}P_{lm}$$

$$\frac{d}{dz}S_{l'm'} = S_{l'm'}\sum_{l',m'}P_{lm}K_{lm,l'm'} - \sum_{l'',m''}K_{l'm',l''m''}(S_{l'm'} - S_{l''m''}) - \alpha_{l'm'}S_{l'm'}$$

In these equations, z is the distance along the fiber, $P_{lm}$ and $S_{lm}$ refer to power in the l,m modes of the pump and the Stokes fields, $\alpha_{lm}$ is the attenuation for the l,m mode, and κ is a linear coupling between two modes at the pump or Stokes wavelength. We are assuming for the sake of simplicity that the modes are identical at the two wavelengths, since the difference is small and the number of modes is presumed to be large. The coupling between the pump and Stokes modes is provided by the nonlinear mode coupling coefficient K that relates gain for a particular Stokes mode to power in a particular pump mode. It is different from that derived in the '087 Rice patent and is given by:

$$K_{lm,l'm'} = \frac{\iint_F g_R(r)\cdot\psi_{lm}^2(r,\phi)\cdot\psi_{l'm'}^2(r,\phi)\cdot r\,dr\,d\phi}{\iint_F \psi_{lm}^2(r,\phi)\cdot r\,dr\,d\phi \cdot \iint_F \psi_{l'm'}^2(r,\phi)r\,dr\,d\phi}$$

In the '087 Rice patent, the Raman gain coefficient $g_R$ was constant and taken to the outside of the area integral in the denominator above. The essence of the present invention is that including the radial variation of $g_R(r)$ enhances the nonlinear coupling for modes that have radial variations matching the gain profile. Hence, on axis Stokes modes can be enhanced at the expense of higher order modes if the Raman gain coefficient is peaked on axis as described above. Of course, on axis modes could be discriminated against by a similar argument, or some radial dependence could be favored by an appropriate design and fabrication technique.

Even though the on axis modes can be emphasized as described, the coupling to higher order modes does not go to zero, so pump power in such modes can be converted efficiently to the desired low order Stokes mode as signal and pump power propagates down the fiber. Hence, power and gain are not left behind to encourage the growth of unwanted higher order Stokes modes.

Figure 3:
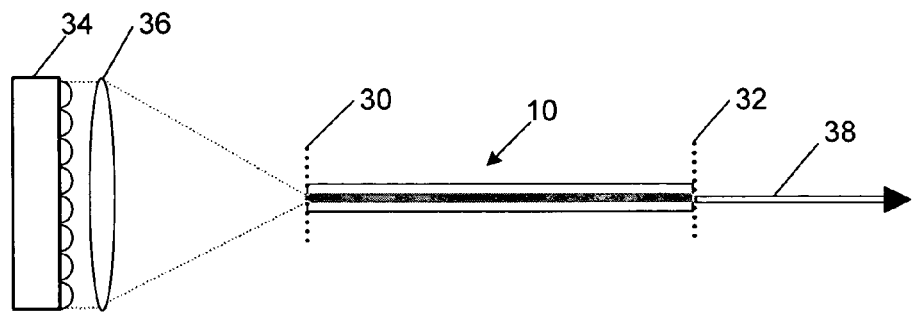
FIG. 3 is a schematic view of a laser diode pumped Raman laser oscillator in accordance with the invention.

FIG. 3 shows the graded index multimode fiber 10 of the invention, as used in a laser diode pumped laser oscillator. A high reflectivity mirror 30 is positioned at one end of the fiber 10 and a partially transmitting output mirror 32 is positioned at the other end. A laser diode pump array 34 provides a high brightness pump radiation that is launched into the fiber 10 through a focusing lens 36 and through the mirror 30. Oscillation in the lowest order mode of the fiber results with a high efficiency conversion of pump power to output power, obtained from output beam 38.

The multimode Raman fiber device with mode discrimination can also be used as a Raman amplifier for input signals of precise wavelength. In a configuration similar to FIG. 3, an input signal (not shown) is also coupled into the fiber in a manner that excites primarily the lowest order mode at the Stokes wavelength, together with the output of the high power multimode pump radiation source 32 to provide Raman gain. The fiber device 10 preserves and improves the beam quality of the input signal as it propagates down the fiber and is amplified.

Figure 4:
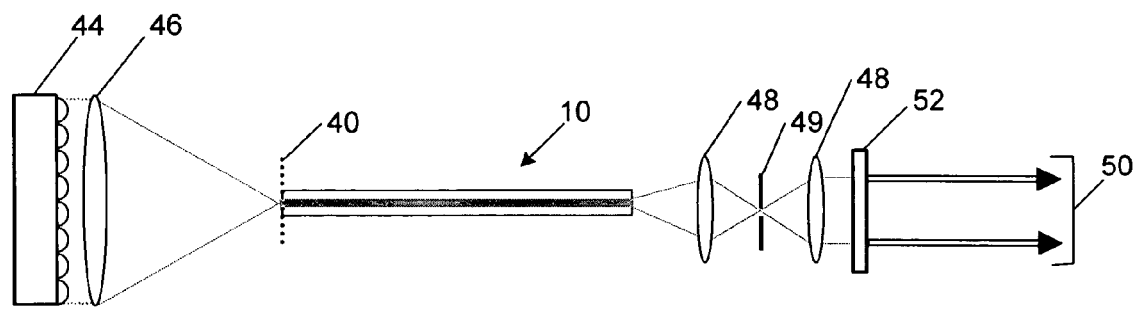
FIG. 4 is a schematic view of a laser diode pumped Raman laser oscillator similar to that shown in FIG. 3, and including an auxiliary resonator.

FIG. 4 shows the multimode Raman fiber device of the invention, applied to a laser diode pumped Raman laser oscillator with an auxiliary resonator. The graded index fiber 10 has a high reflectivity mirror 40 at one end and an antireflectivity coating spaced apart from its other end. As in FIG. 3, a laser diode pump array 44 provides a high brightness output that is launched into fiber 10 through a focusing lens 46 and through the mirror 40. Output from the fiber 10 passes through a pair of lenses 48 and a pinhole filter 49 positioned between the lenses. The combination of the lenses 48 and the pinhole filter 49 produces a generally collimated beam 50. An output mirror 52 reflects a portion of the output energy back through the lenses 48 and into the fiber 10.

It will be appreciated from the foregoing that the present invention represents a significant advance in the field of Raman amplifiers. In particular, the invention provides a graded index multimode fiber that efficiently converts diode pump power into a diffraction limited output beam. Although the fiber of the invention is a multimode fiber, its core is graded in such a way that the Raman gain effect favors oscillation in the lowest order mode of the fiber. It will also be understood that, although the invention has been illustrated in the context of an amplifier, an oscillator, or an oscillator with an auxiliary resonator, the fiber of the invention may be incorporated into various other conventional configurations of optical components. Accordingly, the invention should not be limited except as by the appended claims.

The invention claimed is:

1. A multimode optical fiber that favors lower order modes, the fiber comprising:
   a core comprising a single core region, the single core region having a longitudinal optical axis and incorporating radially dependent amounts of dopant material and selected transparent oxides at each given radius from the longitudinal optical axis, the dopant material and the selected transparent oxides being selected to provide a measure of independent control over both a desired refractive index profile and a desired radially dependent Raman gain coefficient profile that favors lower order modes and discriminates against higher order modes, the refractive index and the Raman gain coefficient have their highest values along the optical axis of the fiber; and
   a cladding region surrounding the core and having a refractive index different from that of the core material;
   wherein light launched into an end of the fiber is subject to higher Raman gain along the optical axis, which promotes lower order modes and discriminates against higher order modes.

2. A multimode optical fiber as defined in claim 1, wherein the dopant that affects the Raman gain coefficient is germanium oxide.

3. A multimode optical fiber as defined in claim 1, wherein the refractive index profile and the Raman gain coefficient profile both have a generally parabolic shape with a peak coinciding with the optical axis of the fiber.

4. A multimode optical fiber as defined in claim 1, wherein the radially dependent amounts of dopant materials comprise a minimum amount of dopant material near an interface between the core and the cladding region with a gradual transition to a maximum amount at the optical axis.

5. A multimode optical fiber as defined in claim 1, wherein the fiber is configured to provide higher Raman gain along the optical axis for multimode light launched into the fiber.

6. A Raman laser oscillator, comprising:
   a multimode optical fiber that favors lower order modes, the fiber comprising a core having a longitudinal optical axis and incorporating radially dependent amounts of dopant materials and selected transparent oxides that are selected to provide a measure of independent control over both a desired refractive index profile and a desired Raman gain coefficient profile that favors lower order modes and discriminates against higher order modes, and a cladding region surrounding the core and having a refractive index different from that of the core material, the refractive index and the Raman gain coefficient have their highest values along the optical axis of the fiber, the refractive index profile and the Raman gain coefficient profile both having a generally parabolic shape with a peak coinciding with the optical axis of the fiber;
   a diode laser array providing pump power to the laser oscillator;
   means for launching the pump power into the fiber; and
   reflective means defining a laser cavity encompassing the fiber;
   wherein light launched into the fiber is subject to higher Raman gain along the optical axis, which promotes lower order modes and discriminates against higher order modes.

7. A Raman laser oscillator as defined in claim 6, wherein the reflective means comprises a highly reflective mirror positioned at one end of the fiber and a partially transmitting minor at the other end of the fiber.

8. A Raman laser oscillator as defined in claim 6, wherein:
   the reflective means comprises a highly reflective mirror at one end of the fiber and a partially transmitting minor; and the oscillator further comprises optical means for receiving light emitted from the other end of the fiber and transmitting a generally collimated beam to the partially transmitting minor.

9. A Raman laser oscillator as defined in claim 8, wherein the optical means comprises multiple lenses and a pinhole filter.

10. A Raman laser oscillator as defined in claim 6, wherein the radially dependent amounts of dopant materials comprise a minimum amount of dopant material near an interface between the core and the cladding region with a gradual transition to a maximum amount at the optical axis.

11. A Raman laser oscillator as defined in claim 6, wherein the fiber is configured to provide higher Raman gain along the optical axis for multimode light launched into the fiber.

12. A method of generating a diffraction limited high brightness laser beam in a multimode fiber, the method comprising:

provding a multimode fiber having a core with radially dependent amounts of dopant materials and selected transparent oxides that are selected to provide a measure of independent control over both a refractive index profile and a Raman gain index profile with maxima coinciding with an optical axis of the fiber, the multimode fiber incorporating a minimum amount of dopant material near an interface between the core and a cladding region with a gradual transition to a maximum amount at the optical axis;

generating high brightness pump power in a laser diode array;

launching the pump power into one end of the multimode fiber;

in the fiber, favoring the lowest order mode by providing maximum Raman gain along the optical axis, and discriminating against higher order modes;

providing a laser cavity that encompasses the multimode fiber; and outputting a diffraction limited high brightness beam from the laser cavity.

13. The method of claim 12, wherein launching the pump power into one end of the multimode fiber comprises launching a multimode laser input into one end of the multimode fiber.

* * * * *